PROCESS FOR DEPOSITING SILICON DIOXIDE DIELECTRIC COATINGS

Filed June 18, 1962 2 Sheets-Sheet 1

INVENTORS
CHARLES R. BARNES &
CHARLES R. GEESNER
BY
Wade Koontz
William J. O'Brien
ATTORNEYS INVENTORS.
CHARLES R. BARNES &
CHARLES R. GEESNER
BY
Wade Koontz and
William J. O'Brien
ATTORNEYS United States Patent Office 3,123,497
Patented Mar. 3, 1964

3,123,497

PROCESS FOR DEPOSITING SILICON DIOXIDE DIELECTRIC COATINGS

Charles R. Barnes, Medway, and Charles R. Geesner, New Carlisle, Ohio, assignors to the United States of America as represented by the Secretary of the Air Force Filed June 18, 1962, Ser. No. 203,410
7 Claims. (Cl. 117—230)
(Granted under Title 35, U.S. Code (1952), sec. 266)

The invention described herein may be manufactured and used by or for the United States Government for governmental purposes without the payment to either of the inventors of any royalty thereon.

This invention relates to a method of depositing thin films of high dielectric strength and, more specifically, to a method of depositing thin films of highly pure silicon dioxide particularly resistant to deterioration at high temperature.

The recent advent of high speed aircraft, missiles and space vehicles has created a need for high temperature resistant electronic materials and miniaturized electronic equipment suitable for use in control circuits and capable of operating within an environment of heat such as that which occurs during re-entry. It became necessary, therefore, to develop thin films of solid state materials having high dielectric strength and capable of operating satisfactorily in electronic circuits at temperatures in the range of 600° C.

Heretofore, considerable difficulty has been encountered in attempting to produce high temperature resistant dielectric silicon dioxide films. The deposition of silicon dioxide through the decomposition of tetraethyl silicate resulted in a film which was adversely affected when heated to elevated temperatures. A decreasing resistivity and an increasing dissipation factor resulted when such films were subjected to temperatures of approximately 300° C. Consequently, their usefulness in the electronic control circuits utilized in modern high speed aircraft was of little or no value. Silicon dioxide dielectric films produced from the vacuum evaporation of silicon monoxide also proved to be inadequate when subjected to high temperature. Apparently, the failure of these films to operate at the degree of efficiency necessary to produce optimum results was due to the presence of impurities. In addition, the decomposition of tetraethyl silicate left an undesirable carbon residue from the ethyl group, while the films produced from the vacuum evaporation of silicon monoxide contained metallic impurities.

In accordance with this invention, however, it now has been discovered that the above noted deficiencies of presently known dielectric silicon dioxide films can be abrogated by producing thin films of highly pure silicon dioxide through the pyrolytic hydrolysis of silicon tetrabromide from the vapor phase. Such films are capable of operating satisfactorily in electronic circuits at temperatures up to 600° C. and, in addition, when applied to molybdenum surfaces increases the oxidative resistance of this metal in a significant manner even at temperatures as high as 1000° C. or above.

Accordingly, it is the primary object of this invention to provide an improved method for producing silicon dioxide dielectric films.

Another object of this invention is to provide an improved method for depositing thin films of highly pure silicon dioxide on metallic substrates.

Still another object of this invention is to provide an improved method for producing silicon dioxide films which will operate satisfactorily as a dielectric material at temperatures up to 600° C.

A further object of this invention is to provide an improved method for depositing thin silicon dioxide films onto a metal substrate in order to effectuate an unexpected increase in the oxidative resistance of the metal substrate at temperatures of about 1000° C. or above.

The novel features which are believed to be characteristic of the invention are set forth in the appended claims. However, the invention, both as to its organization and method of operation, together with further objects, features, and advantages thereof, may best be understood by reference to the following detailed description taken in conjunction with the accompanying drawings wherein like reference characters designate corresponding parts in the several views.

In accord with the novel procedures provided by this invention, a thin dielectric film or layer of pure silicon dioxide is applied or formed on the surface of a hot substrate maintained at a temperature of 940° C. to 1040° C. The silicon dioxide film is produced from a mixture of silicon tetrabromide vapors and water vapors carried by an inert gas. Deposition results from the hydrolysis of the silicon tetrabromide vapors with water vapor and subsequent dehydration at the hot substrate. Suitable carrier gases that may be employed in the process of this invention are argon, nitrogen, helium and carbon dioxide. It has also been found desirable, although not necessary, to introduce hydrogen gas into the system for the purposes of deoxidizing the hot substrate as well as aiding in the removal of occluded impurities from the dielectric film being deposited.

Smoothly polished disks of molybdenum have been found to be especially useful as the substrate upon which the dielectric film is deposited by the method described herein. The surface of the molybdenum disk should be cleaned in succession with acetone, a hot water solution of sodium hydroxide, hot chromic acid, distilled water, and finally wiped dry with a clean fine grade of untreated tissue paper. The disk is then ready to be placed in a suitable plating apparatus, heated to the desired temperature, deoxidized with hydrogen, and finally plated with a silicon dioxide dielectric film.

As was stated heretofore, deposition of the silicon dioxide film is accomplished by hydrolysis of the silicon tetrabromide vapors in conjunction with water vapor followed by subsequent dehydration. The steps involved in the hydrolysis and dehydration reaction of the silicon tetrabromide are set forth in Table I.

TABLE I

*Hydrolysis of Silicon Tetrabromide*

(A) $SiBr_4+H_2O \rightarrow Si(OH)Br_3+HBr$ (B) $Si(OH)Br_3+H_2O \rightarrow Si(OH)_2Br_2+HBr$ (C) $Si(OH)_2Br_2+H_2O \rightarrow Si(OH)_3Br+HBr$ (D) $Si(OH)_3Br+H_2O \rightarrow Si(OH)_4+HBr$ (E) $$Si(OH)_4 \xrightarrow[\text{(940°C.–1040°C.)}]{\text{heat}} SiO_2 + 2H_2O$$

Silicon tetrabromide is particularly advantageous to the process of this invention. Referring to Table I, it can be seen that the silicon tetrabromide molecule takes on water as shown by steps (A), (B), and possibly (C), without polymerization and decomposition. Thus, precipitation is prevented prior to deposition on the hot substrate surface. At the substrate surface, steps (D) and (E) are completed resulting in the deposition and formation of a pure silicon dioxide thin dielectric film. The resultant dielectric film is capable of operating satisfactorily in capacitors at temperatures of 600° C. The proper humidity to carry out the deposition process with an optimum degree of success is that represented by a dew point of −80° F. to −90° F. On the centigrade scale −80° F. is about −62° C. and −90° F. is about −68° C.

Figure 1:
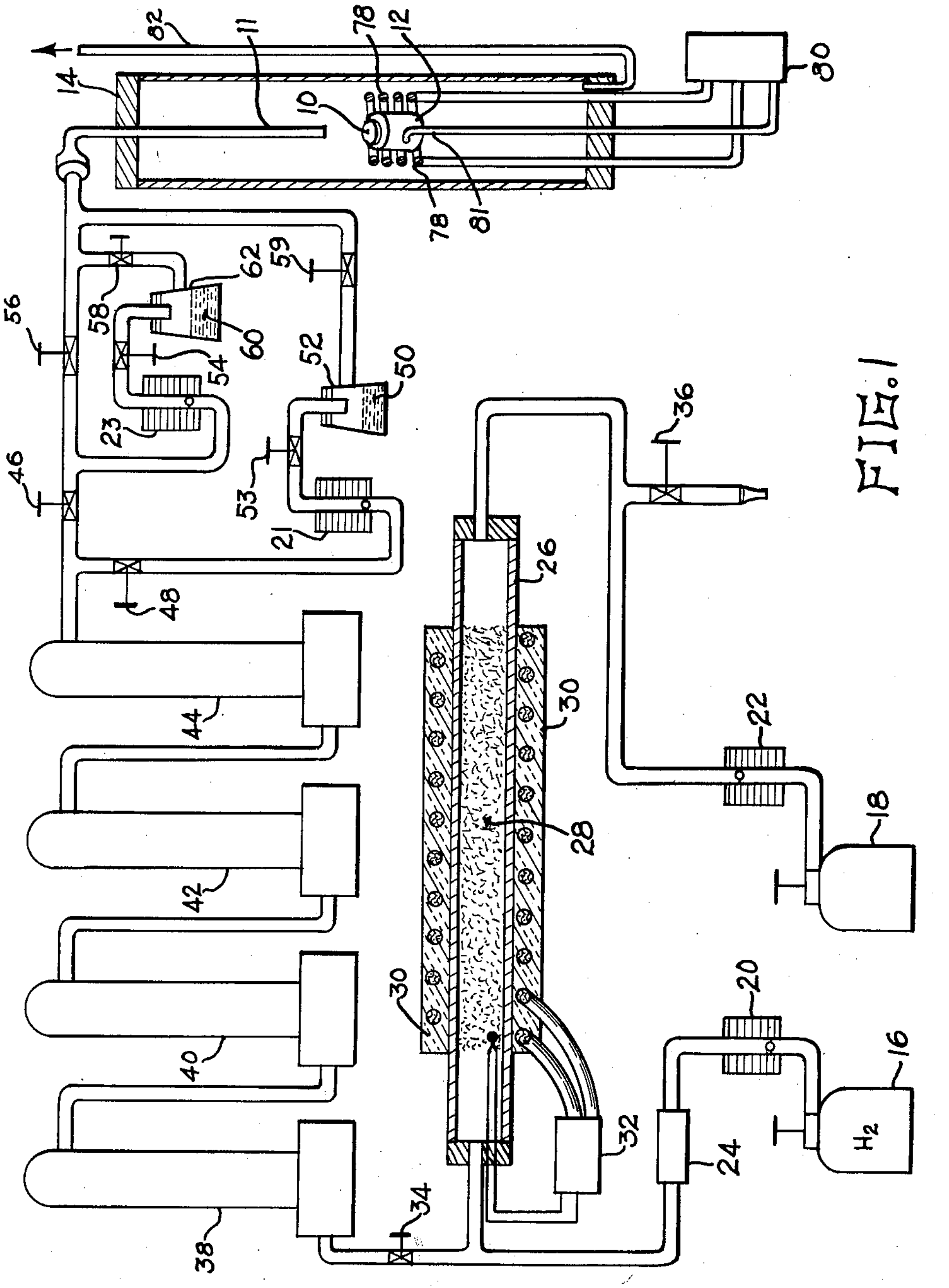
FIGURE 1 is a schematic view of an apparatus suitable for use in carrying out the process of this invention.

The plating process of this invention may be performed with various types of apparatus. However, in FIGURE 1 there is disclosed one form of apparatus that has proven successful. In this figure, a smooth polished molybdenum disk 10, one inch in diameter and 0.005 inch thick, which has been cleared and wiped dry as heretofore disclosed, is placed on a graphite core 12 within a plating chamber 14.

The disk is heated and maintained at a temperature of from 940° C. to 1040° C. by means of a suitable heating element 78, and temperature control unit 80. A suitable temperature sensing device 81 controls unit 80 and also provides support for core 12. Branch line 82 is employed to exhaust the system to the atmosphere.

In the actual plating process, commercial grades of hydrogen and argon gas from containers 16 and 18 are allowed to flow through calibrated flowmeters 20 and 22 at flow rates of 400 milliliters per minute for hydrogen and 1300 milliliters per minute for argon. Both gases pass through deoxidizing units 24 and 26 respectively, for the purpose of removing contaminating oxygen. Unit 24, employed to purify the hydrogen gas, contains a supported palladium metal sponge, not shown, which catalytically converts any oxygen present into water by reaction with hydrogen. The argon gas is purified by passing it over copper turnings 28 contained within unit 26. The copper turnings are maintained at a temperature of 750° C. by some form of heating, for example, as illustrated by an insulated heating jacket 30 and temperature control means 32. The advantage of using separate purification units for the two gases is that the copper turnings 28 contained in unit 26 can be reactivated between production runs by closing valve 34 and back flushing hydrogen over the hot oxidized copper turnings 28. As a result, a large quantity of water is removed from the apparatus through outlet valve 36. Otherwise, the water would rapidly consume the drying agent contained within drying towers 38, 40, 42 and 44.

The hydrogen and argon gases, after passing through their respective deoxidizing units, flow together through drying towers 38, 40, 42 and 44, each of which contains a bed of −4 to 40 mesh calcium hydride. The bed of calcium hydride is approximately seven inches in depth and two inches in diameter. The mixed dry gases are separated into two portions by manipulation of valves 46 and 48. The first portion, at a rate of 100 milliliters per minute, flows through calibrated flow meter 21 and valve 53 and then passes over silicon tetrabromide 50 contained in receptacle 52. Acting as a carrier, the first portion of the mixed gas, picks up the required amount of silicon tetrabromide vapor as it passes over the liquid 50. The second portion of gas, also acting as a carrier, is subdivided by means of the proper manipulation of valves 54 and 56 so that 1000 milliliters per minute are allowed to flow through calibrated flow meter 23 and then pass over a fifty-five percent solution of sulfuric acid 60 contained in a suitable receptacle 62. This allows for the pickup of a predetermined amount of water vapor and its introduction into the total flow of the first portion of the hydrogen-argon carrier gas mixture by the proper manipulation of valves 58 and 59. Finally, the mixed carrier gas portion containing the water vapor and the mixed carrier gas portion carrying the silicon tetrabromide vapor are blown through entrance pipe 11 onto the hot molybdenum substrate 10 resulting in the deposition of a thin film of silicon dioxide. It has been determined that the dew point of the hydrogen-argon-carrier gas mixture should be approximately −80° F. to −90° F. for the particular gas flow rates utilized.

A film of silicon dioxide dielectric was deposited successfully on a molybdenum disk utilizing the apparatus described herein at the rate of one-half mil per hour. By employing higher gas flow rates, it is possible to double the deposition rate of silicon dioxide and produce a highly satisfactory dielectric film at temperatures up to 1040° C.

Other gases, which may be employed successfully as a substitute for the particular carrier gas used in the above-described process, are nitrogen, carbon dioxide and helium. However, it is usually advisable to introduce hydrogen into the system in order to deoxidize the molybdenum substrate at the beginning of the process as well as to aid in the removal of occluded impurities from the dielectric being deposited.

Figure 2:
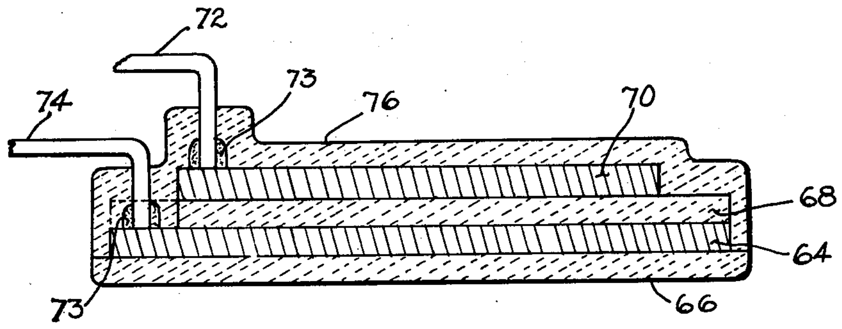
FIGURE 2 is a cross-sectional view in elevation of a silicon dioxide capacitor.
Figure 3:
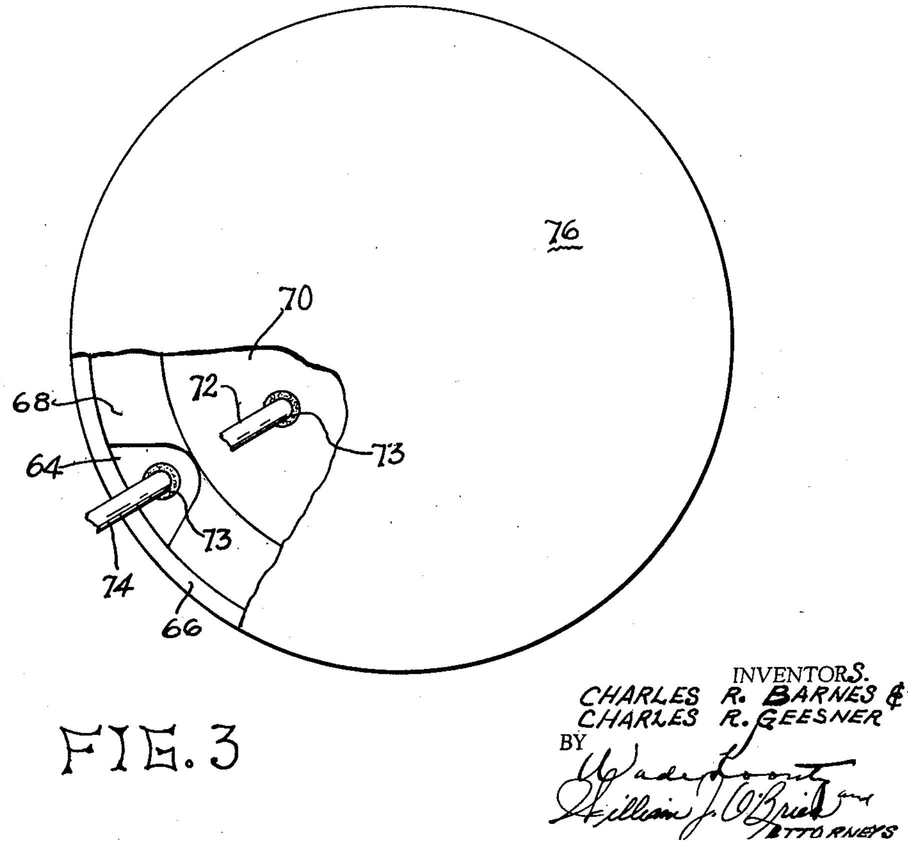
FIGURE 3 is a top view of the silicon dioxide capacitor of FIGURE 2 with a portion of the silicon dioxide film removed.

A number of capacitors were constructed pyrolytically in order to measure the dielectric properties of the silicon dioxide films formed in accordance with the process of this invention and are illustrated in FIGURES 2 and 3. Referring to FIGURES 2 and 3 there is disclosed a capacitor which consists of a molybdenum disk 64 one inch in diameter and 0.005 inch thick on each surface of which is deposited a 0.5 mil thick silicon dioxide dielectric film 66 and 68. A molybdenum film 70, which serves as the second plate of the capacitor, is deposited at a substrate temperature of 800° C. upon the dielectric film 68 by means of the pyrolytic reaction between hydrogen and molybdenum pentachloride vapor. Finally, after attaching platinum lead 74 to molybdenum disk 64 and platinum lead 72 to molybdenum film 70 by means of gold solder 73, another film of silicon dioxide 76 is applied to the upper face of the capacitor assembly in order to complete the encapsulation. The silicon dioxide encapsulation is 0.5 mil thick. The dielectric properties of the silicon dioxide films deposited in accordance with the teachings of this invention are set forth in Table II. Test results were determined by recycling tests performed on capacitor assemblies similar to those illustrated in FIGURES 2 and 3.

TABLE II

*Dielectric Properties of Silicon Dioxide Thin Film Capacitors Versus Heat Exposure*

| Temp. of Heat Exposure, Degrees Centigrade | Capacitor No. 1 (Made w./hydrogen and nitrogen carrier gases) | | Capacitor No. 2 (Made w./hydrogen and argon carrier gases) | |
|---|---|---|---|---|
| | Capacity, mmf. | Dissipation Factor | Capacity, mmf. | Dissipation Factor |
| 25 | 4,725 | 0.0001 | 3,090 | 0.0001 |
| 50 | 4,727 | 0.0001 | ---------- | ---------- |
| 100 | 4,732 | 0.0001 | ---------- | ---------- |
| 150 | 4,738 | 0.0001 | ---------- | ---------- |
| 200 | 4,745 | 0.0001 | 3,102 | 0.0001 |
| 250 | 4,750 | 0.0001 | ---------- | ---------- |
| 300 | 4,756 | 0.0001 | 3,110 | 0.0001 |
| 400 | 4,795 | 0.0003 | 3,120 | 0.0001 |
| 450 | 4,786 | 0.0017 | 3,125 | 0.0001 |
| 500 | 4,798 | 0.0051 | 3,132 | 0.0006 |
| 550 | 4,801 | 0.0125 | 3,142 | 0.0025 |
| 600 | 4,831 | 0.0270 | 3,150 | 0.0063 |

Referring to Table II, the capacitor designated as number 2 was constructed by utilizing hydrogen and argon carrier gases for deposition of the silicon dioxide dielectric film. Examination of the data compiled from testing the capacitor designated as number 2 discloses that the silicon dioxide dielectric film performs satisfactorily at temperatures up to 600° C. or above. At 600° C., its dissipation factor is below one percent and its capacity has increased by only 1.9 percent when heated from 25° C. to 600° C. The test data for the capacitor designated as number 1 clearly discloses that nitrogen can be substituted satisfactorily for argon as a carrier gas with equal results achieved within an acceptable experimental error. The dielectric strength of the silicon dioxide dielectric film was measured as 1000 volts per mil at 25° C. and 600 volts per mil at 600° C.

In order to further test the thermo stability of pyrolytically deposited silicon dioxide dielectric films over an extended period of time, a representative capacitor was produced in accordance with the teachings of this invention and placed in an oven and maintained at a temperature of 500° C. for 400 hours. The capacitor functioned satisfactorily, both during heat exposure and after cooling to room temperature. In order to determine the capabilities of the silicon dioxide films of this invention to serve as a protective coating for metals, one of the molybdenum disks was coated on each side with a film of silicon dioxide of 0.5 mil thickness and placed together with an uncoated disk of the same metal into an oven and maintained at a temperature of 1000° C. The uncoated disk oxidized and evaporated almost immediately. However, the coated disk remained intact for approximately one hour. Even then, the breakdown appeared to be due only to seepage of oxygen from the air at the sharp edges of the disk where evidently the protective coating may not have been of sufficient thickness.

From an examination of the test results set forth in Table II, it can be seen that the instant invention provides a new and improved method for forming a thin silicon dioxide dielectric film on a substrate surface. A high degree of thermal stability and resistance to oxidative degradation makes the films of the present invention especially suitable for use in the manufacture of electronic devices used in modern day high-speed aircraft and missiles.

It will be understood by those skilled in the art to which the present invention pertains that while the method disclosed herein illustrates a preferred embodiment of the invention, modifications and alterations can be made without departing from the spirit and scope thereof, and that all such modifications as fall within the scope of the appended claims are intended to be included herein.

What we claim is:

1. A method for forming a silicon dioxide film on a substrate surface comprising the steps of passing a first carrier gas over silicon tetrabromide, passing a second carrier gas over a fifty-five percent solution of sulfuric acid, combining said first and second carrier gases and blowing said combined carrier gases onto a hot substrate maintained at the temperature range of 940° C. to 1040° C. in order to deposit a thin film of silicon dioxide thereon.

2. A method in accordance with claim 1 wherein said first and second carrier gases consist essentially of the same material.

3. A method in accordance with claim 1 wherein said first and second carrier gases each consist essentially of a mixture of hydrogen and argon.

4. A method in accordance with claim 1 wherein said substrate consists of molybdenum.

5. A method in accordance with claim 1 wherein said first carrier gas flows at a rate of 100 milliliters per minute in order to pickup a predetermined amount of silicon tetrabromide vapor and said second carrier gas flows at a rate of 1000 milliliters per minute in order to pickup a predetermined amount of water vapor.

6. A method in accordance with claim 1 wherein said hot substrate is maintained at temperature of from about 940° C. to 1040° C.

7. A method for coating a molybdenum surface with silicon dioxide by pyrolytic deposition comprising the steps of passing a first carrier gas consisting essentially of a mixture of hydrogen and argon over silicon tetrabromide at the rate of 100 milliliters per minute in order to pickup a predetermined amount of silicon tetrabromide vapors, passing a second carrier gas consisting essentially of a mixture of hydrogen and argon over a 55 percent solution of sulfuric acid in order to pickup a predetermined amount of water vapor, combining said first and second vapor containing carrier gases such that the dew point of said combined carrier gases ranges from about −62° C. to −68° C. and blowing said combined vapor containing carrier gases onto a hot molybdenum surface maintained at a temperature of from about 940° C. to 1040° C. in order to deposit a thin film of silicon dioxide on said surface.

References Cited in the file of this patent

UNITED STATES PATENTS 2,886,414 Secord ---------------- May 12, 1959

FOREIGN PATENTS 675,341 Great Britain ----------- July 9, 1952

OTHER REFERENCES

Powell et al.: Vapor Plating (1955), John Wiley & Sons (N.Y.), TS 695.B3 (pp. 136–142).